Dec. 14, 1954 G. OULIANOFF 2,696,709
COMBUSTION SYSTEM OF INTERNAL-COMBUSTION ENGINES
Filed Sept. 20, 1951 7 Sheets-Sheet 1
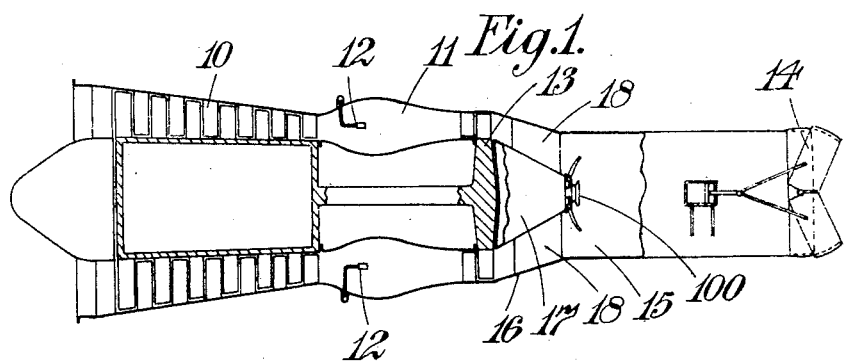
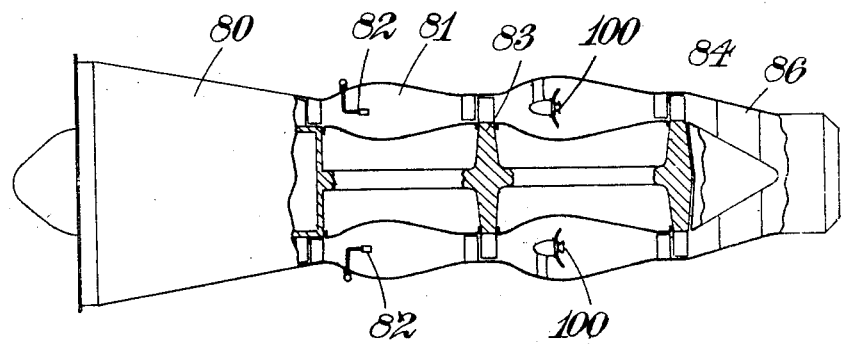
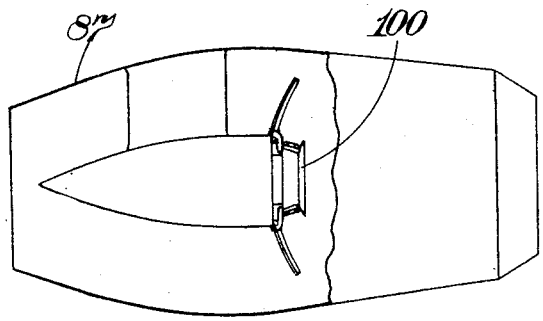
INVENTOR
GEORGE OULIANOFF
By Wilkinson & Mawhinney
ATTYS.

Dec. 14, 1954  G. OULIANOFF  2,696,709
COMBUSTION SYSTEM OF INTERNAL-COMBUSTION ENGINES
Filed Sept. 20, 1951  7 Sheets-Sheet 2
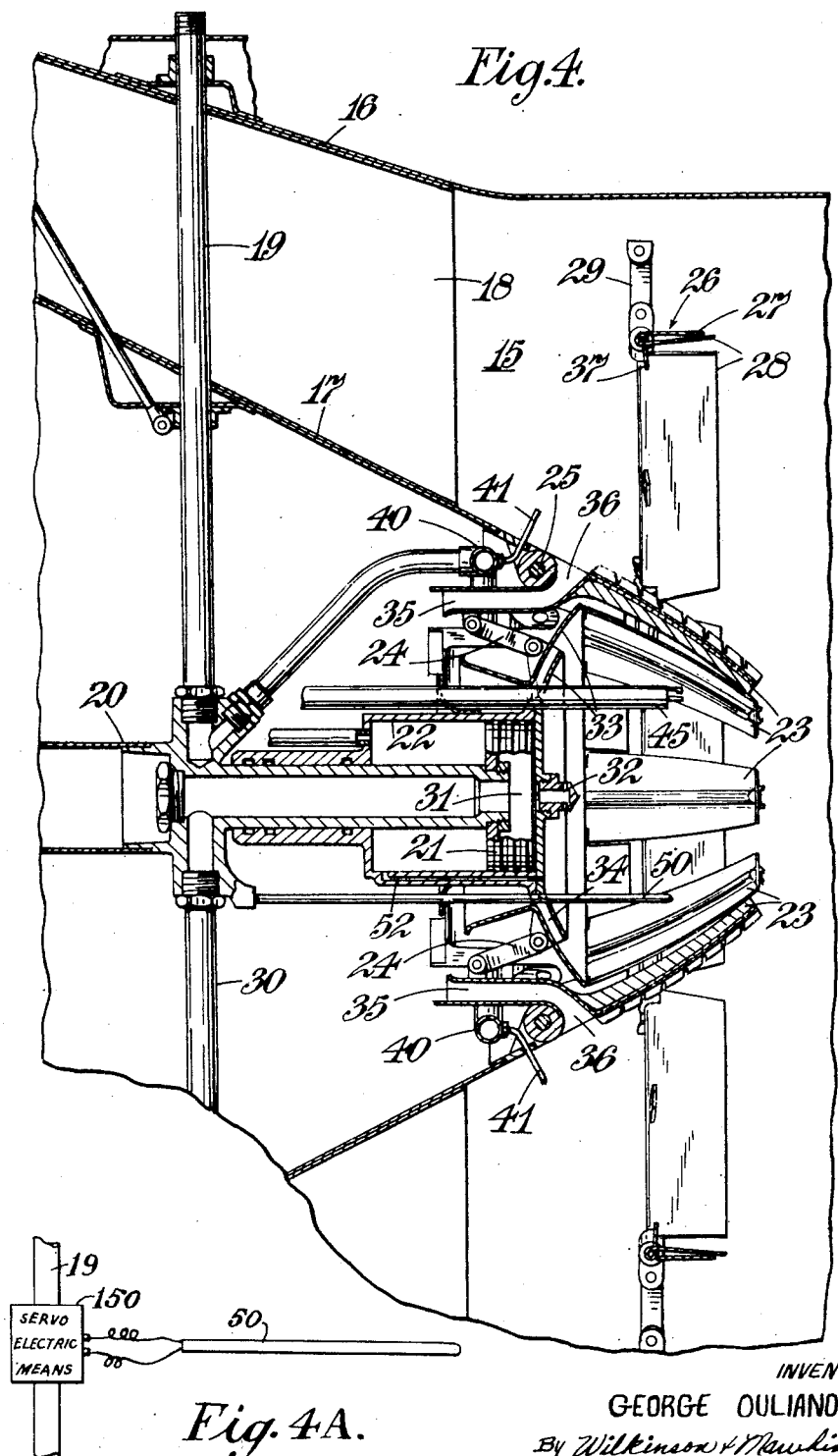
INVENTOR
GEORGE OULIANOFF
By Wilkinson & Mawhinney
ATTYS.

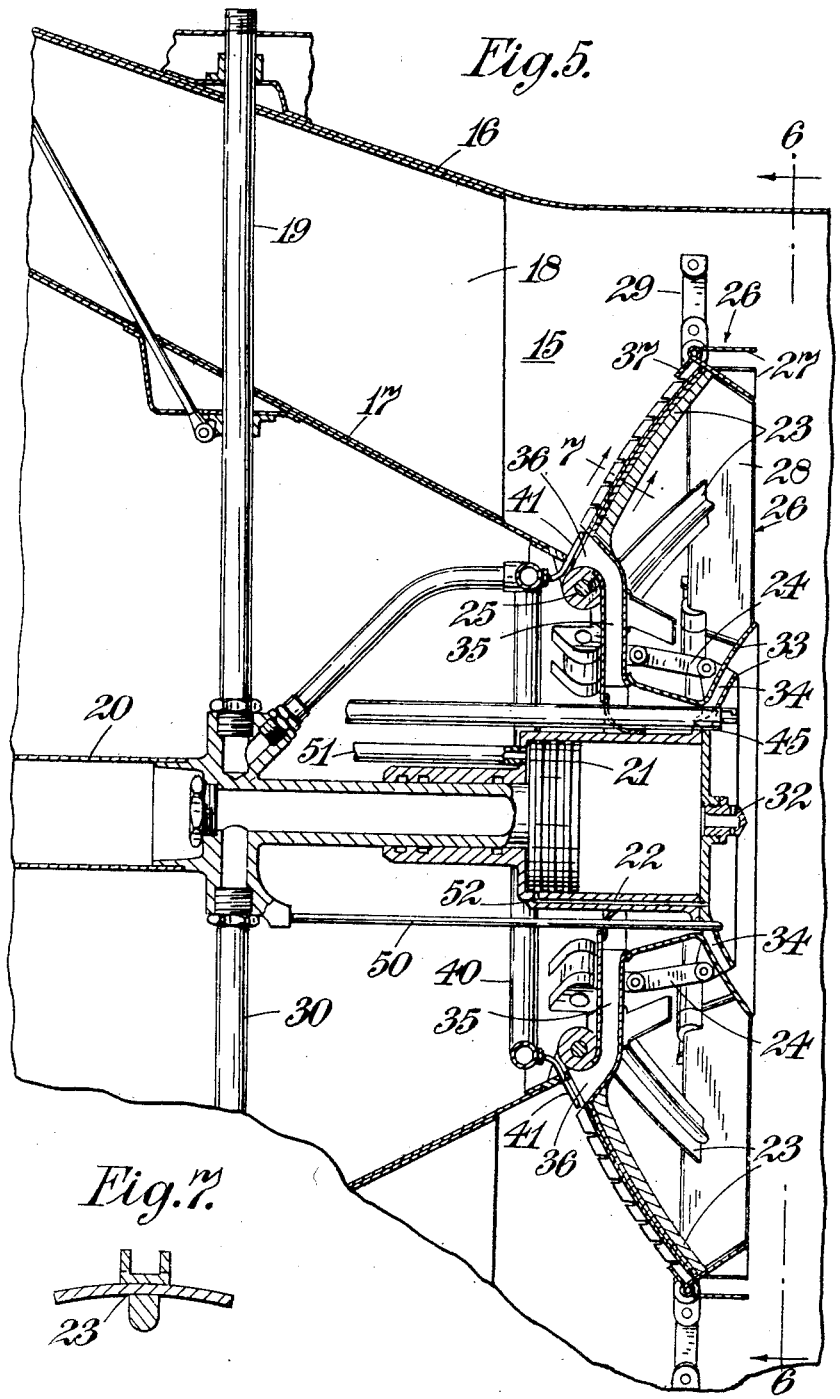

Dec. 14, 1954
G. OULIANOFF
2,696,709
COMBUSTION SYSTEM OF INTERNAL-COMBUSTION ENGINES
Filed Sept. 20, 1951
7 Sheets-Sheet 4
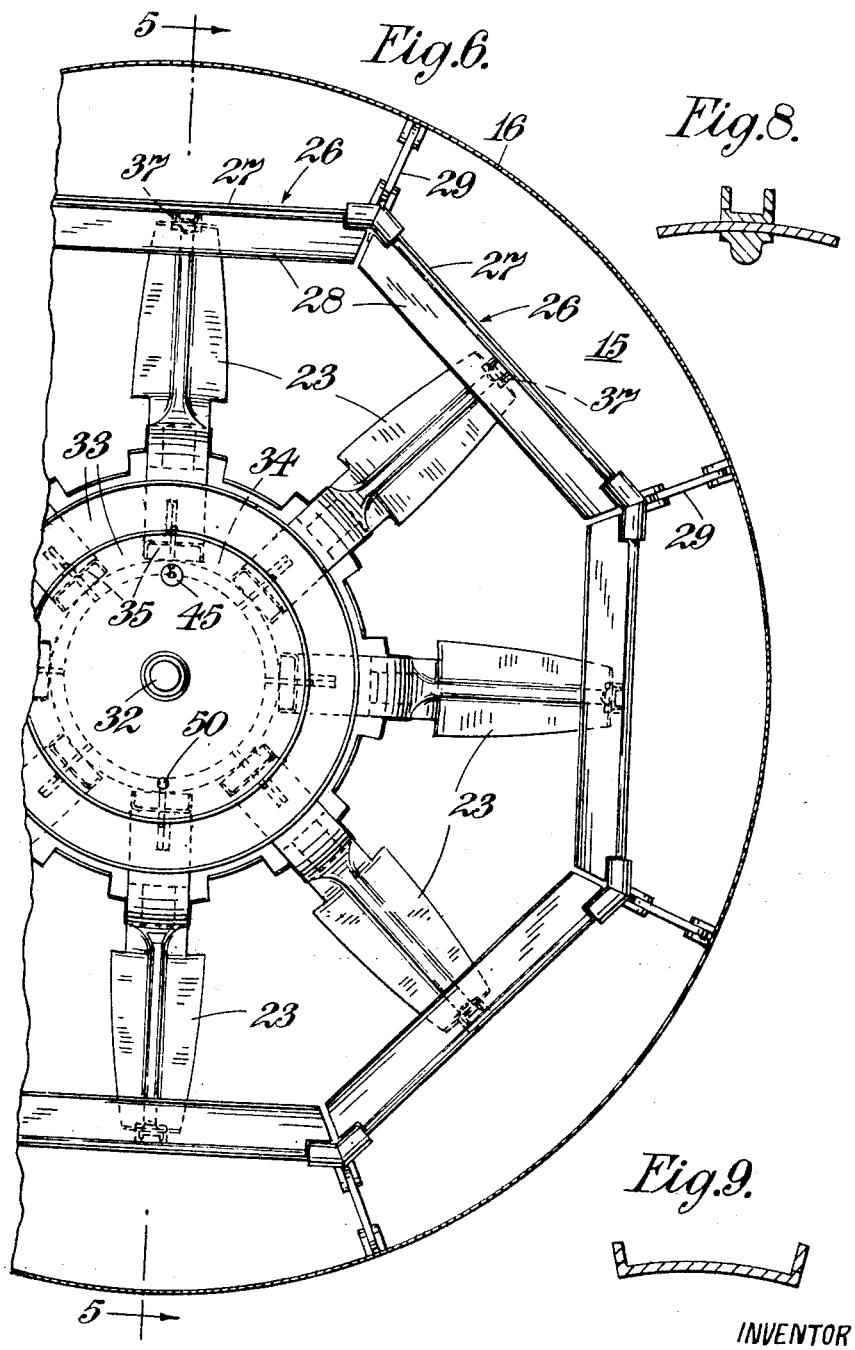
INVENTOR
GEORGE OULIANOFF
By Wilkinson & Mawhinney
ATTYS.

Dec. 14, 1954 G. OULIANOFF 2,696,709
COMBUSTION SYSTEM OF INTERNAL-COMBUSTION ENGINES
Filed Sept. 20, 1951 7 Sheets-Sheet 5
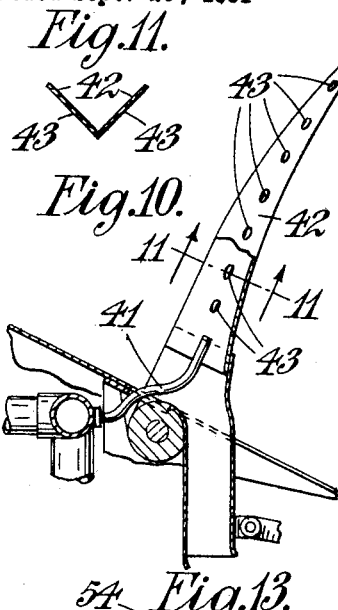
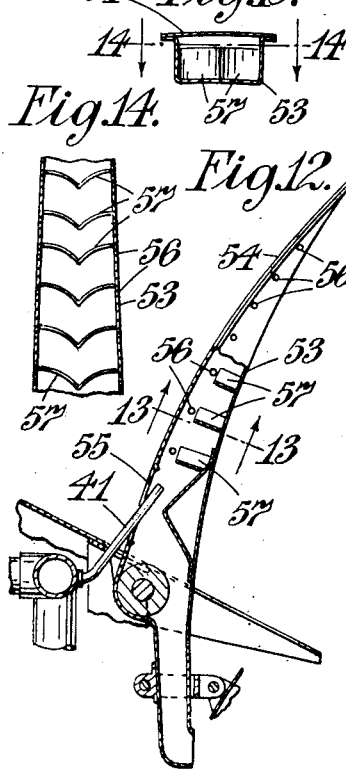
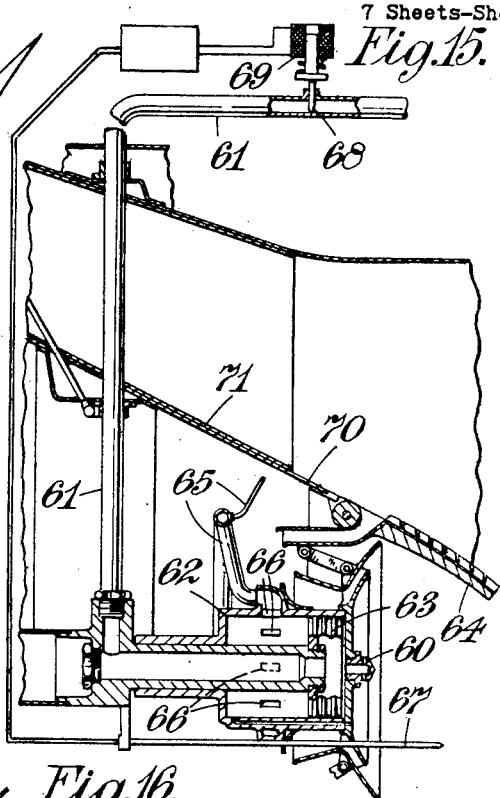
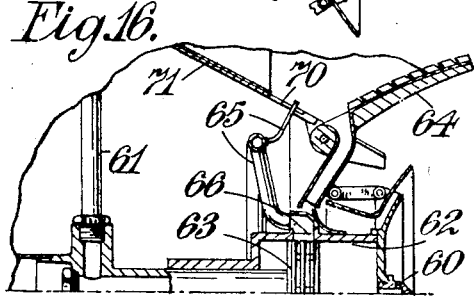
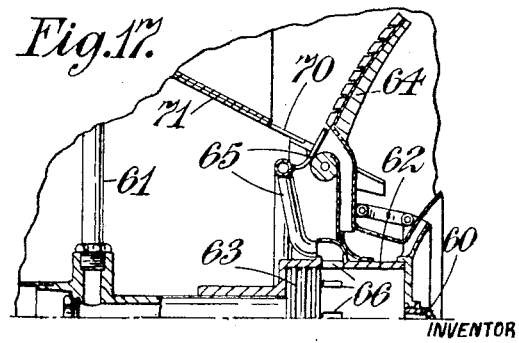
INVENTOR
GEORGE OULIANOFF
By Wilkinson + Mawhinney
ATTYS.

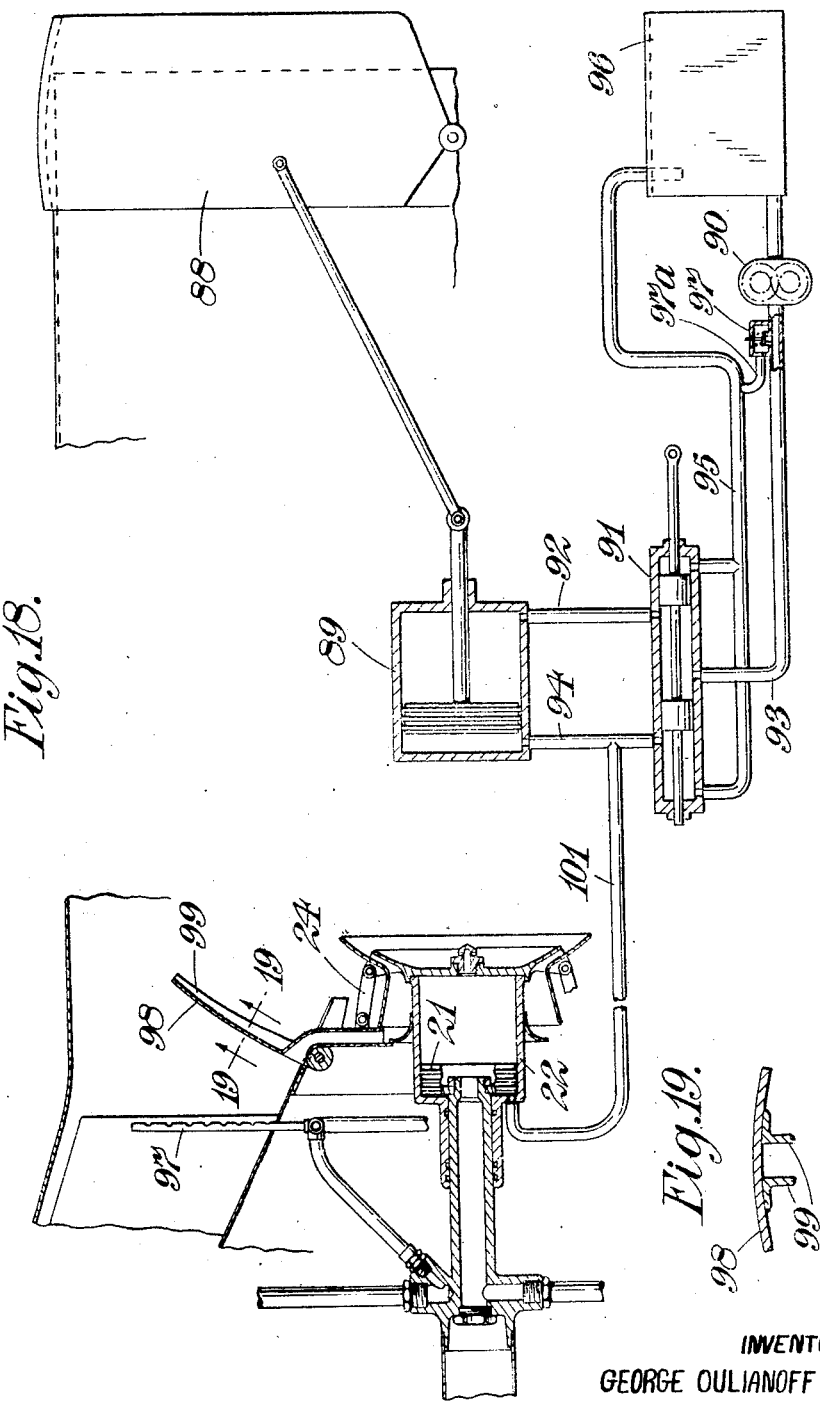

Dec. 14, 1954     G. OULIANOFF     2,696,709
COMBUSTION SYSTEM OF INTERNAL-COMBUSTION ENGINES
Filed Sept. 20, 1951     7 Sheets-Sheet 7
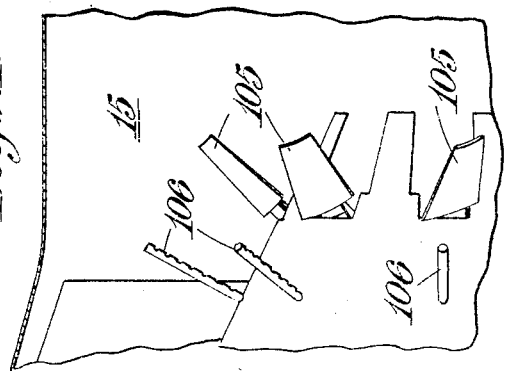
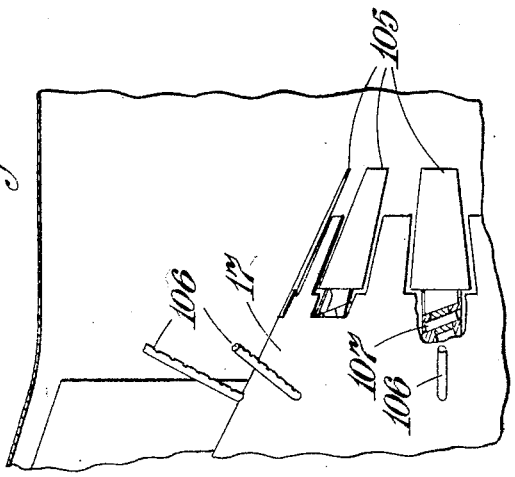
INVENTOR
GEORGE OULIANOFF
By Wilkinson & Mawhinney
ATTYS.

United States Patent Office 2,696,709
Patented Dec. 14, 1954

2,696,709

COMBUSTION SYSTEM OF INTERNAL-COMBUSTION ENGINES

George Oulianoff, Allestree, Derby, England, assignor to Rolls-Royce Limited, Derby, England, a British company Application September 20, 1951, Serial No. 247,418

Claims priority, application Great Britain September 27, 1950

13 Claims. (Cl. 60—35.6)

This invention relates to combustion systems for internal combustion engines of the kind comprising a duct through which combustion-supporting gas flows and baffle means operative to provide a sheltered region in the duct, in which stable combustion can be obtained.

One known kind of combustion system of an internal combustion engine of the kind described employs a pilot fuel section and a main fuel section, the pilot fuel being first ignited to provide a stable area of flame by which the main fuel is subsequently ignited and kept burning.

According to the present invention, there is provided a combustion system for an internal combustion engine comprising a duct through which combustion supporting gas flows, a body having a substantially frusto-conical downstream end within said duct with its apex end downstream and with its axis extending in the direction of gas flow through the duct, a plurality of baffle elements pivotally mounted on said frusto-conical downstream end of said body to be movable between an inoperative position in which they lie approximately on the surface of the cone of said frusto-conical downstream end and extend downstream beyond said frusto-conical downstream end and an operative position in which they extend at least part way across said duct in a substantially radial plane from the axis of said frusto-conical downstream end, main fuel injector means for introducing fuel into said duct to be stabilized in combustion by said baffle elements, pilot burner means mounted in the downstream end of said body, pilot baffle means supported by said pilot burner means, said pilot burner means and said pilot baffle means being movable along the axis of said frusto-conical downstream end between an inoperative position where they are enclosed by said baffle elements when the latter are in their inoperative position, and an operative position where said pilot burner means and said pilot baffle means lie substantially in the radial plane containing said baffle elements in their operative position, and means for effecting movement of the said baffle elements and said pilot burner means and said pilot baffle means between their operative and inoperative positions.

Hitherto, it has been known to provide gas turbine engines with a reheat combustion system situated in the exhaust duct downstream of the turbine. The quantity of air supplied by the compressor of a gas turbine engine to the main combustion system is far in excess of that necessary for complete combustion of the main fuel, the excess being necessary to keep the working temperature down to a value which the material of the engine can stand in operation. Thus excess air is available in the exhaust gas stream to be mixed with fuel to provide additional power above the normal maximum. Reheat combustion systems may for example be employed in a turbo-jet engine or prop-jet engine in an aircraft between the turbine system and the final exit nozzle, or may be employed between turbine stages in a stationary or marine engine. Such reheat systems are usually employed intermittently, for example, during take-off or climb of an aircraft or for emergency use when additional power above the maximum is required.

According to a feature of the invention the combustion system may constitute the reheat combustion system of a gas turbine engine. When the reheat combustion system is not in use, the baffle means will be kept in the non-baffling position and will not disturb the flow of exhaust gas in the exhaust duct. When the reheat system is required to be used, the baffle means will be moved to the operative position in which they disturb the flow in the exhaust duct and provide downstream of themselves sheltered regions in which stable combustion may readily be supported.

One type of internal combustion engine for an aircraft, known as a "ram-jet", comprises a simple duct which makes use of the ram effect due to its velocity through the air for compression of the combustion air. Such engines are usually employed intermittently, due to their inherent inefficiency at low forward speeds.

According to another feature of the invention, the combustion system may constitute the combustion system of a ram-jet. Thus energy losses which would be associated with the equivalent fixed baffle means may be reduced by moving the retractable baffle means into their retracted position when the ram-jet is not in operation.

Another object of the invention is to provide a combustion system in which the pilot fuel pressure may be used to move the baffle elements from the non-baffling position to the operative position and to maintain the baffle elements in the operative position.

Another object of the invention is to provide a fuel system of the kind described in which the same fuel supply may be used for the pilot burner means and the main fuel injectors and in which the fuel system to the main fuel injectors is controlled so that fuel is supplied to them only after the baffle elements have moved from their inoperative position.

Another object of the invention is to provide a combustion system of the kind described in which the baffle elements may be secured in their inoperative positions by compressed air, or by servo fluid employed to adjust a variable area nozzle at the outlet of the duct, when the combustion system is not in use.

Another object of the invention is to provide a combustion system of the kind described in which means may be provided to facilitate the ignition of the spray of fuel from the pilot burner means.

Several embodiments of the invention will now be described with reference to the accompanying drawings of which Figures 1, 2 and 3 show, partly in section, various internal combustion engines in which the invention is employed.

Figure 4 is a sectional elevation of one embodiment of the invention with baffle means in the non-baffling position.

Figure 4A is a schematic view of the thermocouple means controlling the fuel supply.

Figure 5 is a sectional elevation, on the line 5—5 in Figure 6, of the embodiment shown in Figure 4 with the baffle means in their operative position, Figure 6 is a section taken on the line 6—6 in Figure 5, Figure 7 is a cross-section on the line 7—7 in Figure 5, Figures 8 and 9 are cross sections of modifications of the part shown in Figure 7, Figure 10 is an elevation partly in section of one form of baffle means, Figure 11 is a section on the line 11—11 in Figure 10, Fig. 12 is an elevation partly in section of another form of baffle means, Fig. 13 is a section on the line 13—13 of Figure 12, Figure 14 is a fragmentary section on the line 14—14 in Figure 13, Figures 15, 16 and 17 are part-section elevations of another embodiment of the invention in three different positions, Figure 18 is a diagrammatic arrangement of another embodiment of the invention, Figure 19 is a cross-section on the line 19—19 in Figure 18, and, Figures 20 and 21 are part elevations partly in section of another embodiment of the invention.

Referring to the drawings, Figure 1 shows a gas-turbine engine having an axial flow compressor 10 delivering to combustion equipment 11 into which fuel is injected through the burners 12 and from which the products of combustion pass through the turbine 13 and exhaust duct 15 to the jet nozzle 14. In such an engine the compressor provides a large amount of air in excess of that required for combustion of fuel in the combustion equipment 11 in order to keep the operating temperature below the limit which is determined by the strength of the materials used in the engine. There is thus a supply of combustion-supporting gas available for combustion in the exhaust duct 15 of the turbine. The combustion system according to the invention and generally designated by the reference numeral 100 is employed for the combustion of fuel, when desired, in the exhaust duct 15.

Figure 2 shows another kind of gas-turbine engine in which an axial-flow compressor 80 delivers compressed air to the main combustion equipment 81 into which fuel is injected through the burners 82 and from which the products of combustion pass through a turbine 83. The exhaust from the turbine 83 passes through a combustion system according to the invention, and generally designated 100 before flowing through a second turbine 84 of which the rotor is mounted on the same shaft as that of the first turbine. After passing through the turbine 84 the exhaust gas flows through the exhaust pipe 86. In normal operation sufficient power can be obtained by injecting fuel through the burners 82 only, but when extra power is required the combustion system 100 according to the invention is employed.

Another internal combustion engine in which the present invention can be employed is shown in Figure 3. This engine is a ram-jet and comprises a divergent and convergent duct 87 containing a combustion system 100 which is constructed in accordance with the present invention. When this engine is being employed air passes into the divergent portion of the duct and is compressed due to the reduction in its velocity. Fuel is burnt in the compressed air which is then ejected through the convergent portion of the duct, the resultant thrust being used to propel the vehicle in which the engine is fitted. It is unusual for ram-jet engines to be employed as the only engines of a vehicle because they are very inefficient until the vehicle is travelling at a considerable speed and it is therefore desirable to employ the invention in them so that the resistance which the ram-jet provides when it is not being employed is as small as possible.

The structure of the combustion system 100 employed in all the above engines is the same and for convenience sake it will hereinafter be described as being employed in the re-heat system of a gas-turbine as shown in Figure 1.

Figures 4, 5 and 6 illustrate the mechanism of one embodiment of a combustion system according to this invention and from them it will be seen that the exhaust duct immediately downstream of the turbine is defined on its outer side by an outer wall 16 and on its inner side by a bullet 17 of conical or frusto-conical form. The bullet is supported from the outer wall by means of struts 19 which are enclosed in fairings 18 and which cross the annular exhaust duct. Within the bullet 17, the supporting struts are connected to a central strut 20 lying axially of the turbine.

The downstream end of this central strut 20 has a fixed piston portion 21 formed thereon. A cylinder 22 which is arranged to move axially of the central strut 20 surrounds the piston portion 21. Retractable baffle means, consisting of a plurality of baffle arms 23, are attached to the outer circumference of the cylinder by means of swinging links 24, or other convenient means. Each baffle arm 23 is also pivoted to fixed structure associated with the bullet 17 by means of loose fitting pins 25 or other convenient means. The cylinder 22 is arranged to move over the piston 21 so that at one end of its stroke (Figure 4) the baffle arms 23 are in their retracted position in which they form a part of the normal inner surface of the exhaust passage 15 defined by the bullet 17, and at the other end of its stroke (Figures 5 and 6) the baffle arms 23 are in their operative position in which they extend across the exhaust duct 15 into the gas flow.

Also disposed in the exhaust duct 15 are a plurality of baffle elements 26, one for each of the baffle arms 23, each of which elements comprises two parts 27, 28 relatively movable between an extended position (Figure 5) in which the baffle element causes considerable turbulence in the gas flow and a retracted position (Figure 4) in which the baffle element presents the minimum resistance to flow. In the construction shown the outer part 27, which has the form of a thin rectangular metal sheet, is fixed in a position edge-on to the gas stream, being supported by struts 29 which are pin-jointed to the part 27 and to the outer wall 16 of the exhaust duct to allow for thermal expansion. The inner part 28, which is of generally similar form, is pivoted to the outer part 27 so that when in the operative position the two parts form a V in cross-section and when retracted they lie snugly together and parallel to one another. An arm 37 is attached at the midpoint of each inner part 28 and is arranged to be contacted by the baffle arms 23 when they extend across the exhaust duct. The final movement of the arms 23 into the extended position moves the inner part 28 into the operative position. When the baffle arms 23 are retracted, the inner part 28 is held in the retracted position by the force of the gas flow.

When eight baffle arms 23 are provided, the elements 26 form an octagonal ring in the exhaust duct 15. Conveniently the struts 29 are placed at the angles of the octagon.

The reheat combustion system is provided with a pilot fuel section and a main fuel section, the pilot fuel being first ignited to form a stable flame which serves to ignite the main fuel and maintain the main fuel in combustion. Pilot fuel is fed through one 30 of the bullet-supporting struts to the central strut 20 which is hollow, through a bore 31 in the piston portion 21 into the cylinder 22 on the downstream face of the piston portion 21 and through a burner 32 which is mounted in the downstream end of the cylinder 22 and which has jets arranged to spray pilot fuel radially of the exhaust gas duct 15. Pilot baffle means 33 are secured to the cylinder 22 slightly upstream of the pilot fuel burner 32 and are formed with slots 34 therein which, when the baffle arms 23 are in their operative position, connect through a passageway 35 in each baffle arm to a port 36 facing upstream to the exhaust gas flow, so that when the baffle arms 23 are in their operative position exhaust gas containing air is supplied to the pilot burner space from upstream of the baffle elements 23 through the passageways 35 and slots 34.

Main fuel is supplied through another 19 of the bullet-supporting struts to a manifold 40 in the interior of the bullet 17, and pipes 41 lead from the manifold 40 to supply main fuel to each of the baffle arms 23 in their operative position.

Various forms of baffle arm which may be employed are shown in Figures 7–14. Those shown in Figures 7, 8 and 9 have a channel on their upstream side into which fuel is delivered from a pipe 41 and the channels have slots formed in their sides (see Figures 4 and 5) through which the fuel escapes to be carried downstream of the baffle in the gas flowing past. The depth of the slots may be chosen so that more fuel flows out at the outer end of each arm than at the inner and thus the intensity of combustion is maintained substantially uniform across the duct.

In the embodiment shown in Figures 10 and 11 the baffle-arm is made with an angle section into which fuel is fed from the pipe 41. Each limb 42 of the angle section is pierced by a number of holes 43 through which fuel escapes into the exhaust duct. The diameter of these holes may be chosen so that the amount of fuel escaping at any particular radius is appropriate to give uniform intensity of combustion along the arm.

The baffle arm shown in Figures 12, 13 and 14 comprises a channel 53 and a lid 54 for the channel in which an aperture is provided at 55 to receive the end of the fuel pipe 41. The side walls of the channel 53 are pierced by a series of holes 56 and the channel contains weir plates 57 to control the radial flow of fuel in order that the appropriate quantities pass out of the holes 56 to obtain substantially contsant intensity of combustion.

Reverting now to Figures 4, 5 and 6, an igniter 45 is secured to fixed structure of the bullet 17 to ignite pilot fuel. In operation, fuel under pressure is supplied to the reheat combustion system and flows into the cylinder 22 on the downstream side of the piston portion 21, thus causing the cylinder 22 to move axially downstream from the turbine 13 so that the baffle arms are moved from their retracted position (Figure 4) to their operative position (Figure 5) to extend across the exhaust duct 15. The pilot fuel is sprayed through the pilot burner 32 mounted in the end wall of the cylinder 22 during the movement of the cylinder 22 and during the movement the spray traverses the igniter 45 and is ignited thereby.

This arrangement overcomes the difficulty of determining the correct position in which to place the igniter with respect to the pilot burner since, during the movement of the pilot burner from the ino, erative to the operative position, ignition takes place automatically at the correct point.

Thermocouple means 50 are also secured to the fixed structure of the bullet 17 for the purpose of determining when the pilot fuel is ignited. When the temperature of the thermocouple means 50 is raised by combustion of the pilot fuel, the thermocouple means operate through servoelectric means 150 to turn on the supply of main fuel to the combustion equipment.

Thus when the pilot fuel has been ignited, main fuel is supplied through another 19 of the bullet-supporting struts and through the manifold 40 to each baffle arm 23. Main fuel passes through the interior of the baffle arm and out through holes to the downstream side thereof to be ignited by the pilot flame. Stable combustion is readily supported owing to the fact that sheltered regions are provided by the baffle arms 23.

When the pilot fuel supply is cut off, the pressure of the exhaust gases acting on the baffle arms 23 will tend to move the baffle arms to the retracted position, but in order to ensure that they are kept in their fully retracted position, a supply of pressure air, for example from the compressor 10, is fed through duct 51 to the cylinder 22 on the upstream face of the piston portion 21. A restricted bleed pipe 52 is provided to carry away fuel leaking across the piston rings from the downstream to the upstream face of the piston 21, this pipe 52 leading to the pilot combustion space, and some of the pressure air on this side of the piston will mix with the leakage fuel to assist in its combustion and to assist in its drainage through the bleed pipe.

In an alternative combustion system, illustrated in Figures 15, 16 and 17, both the pilot burner 60 and the main fuel to the baffle means may be supplied from a common fuel supply pipe. The fuel is led through one bullet-supporting strut 61 to the cylinder 62 on the downstream face of the piston 63 and the pilot burner will receive its supply of fuel as in the arrangement described above. In this arrangement, the pressure of the fuel supply for the pilot burner is initially lower than the full main fuel pressure due to the presence of the restriction 68 in the pipe 61, and the reduced pressure is balanced by the drag of the exhaust gases on the baffle arms 64 (of which one only is shown for clarity) to hold the cylinder and baffle arms in some intermediate position (illustrated in Figure 16) between the retracted and the operative positions. The main fuel supply is arranged to be fed to the baffle arms 64 through a plurality of pipes 65, equal in number to the baffle arms 64, which are connected to the interior of the cylinder 62 through ports 66 in the circumference thereof. The ports 66 and their associated main-fuel fed pipes 65 are situated near the upstream end of the cylinder 62 so that when fuel is first supplied to the cylinder 62 with the baffle arms 64 in the retracted position (Figure 15), the ports 66 are not connected to the fuel supply, being isolated therefrom by the piston portion 63. In operation, the cylinder 62 is caused to move axially by the pressure of the fuel supply to the pilot burner 60. Thermocouple means 67 are provided which operate to sense the ignition of the pilot fuel, whereupon the pressure of the fuel supply is automatically increased by energizing solenoid 69 to remove the restriction 68 in the fuel pipe 61, and the baffle arms are moved to their full operative position (Figure 17). During this second part of the movement, when the cylinder 62 has nearly reached the end of its stroke to move the baffle arms 64 into their operative position, the ports 66 associated with the main-fuel feed pipes 65 are gradually uncovered until, at the end of the stroke, the ports 66 are fully uncovered and thus main fuel is fed through the main-fuel feed pipes 65 to each baffle arm 64.

It will be realised that the main-fuel feed pipes 65 move axially with the cylinder 62 and holes 70 are formed in the bullet 71 so that when the baffle arms 64 move into their retracted position the main-fuel feed pipes 65 pass, in the upstream direction, through the holes 70 and into the interior of the bullet 71, so that they do not create any disturbance in the exhaust flow when the reheat combustion system is not in use.

Figure 18 shows diagrammatically a further embodiment of the invention which is employed with an adjustable area jet nozzle. The jet nozzle has two sectors 88 (one only being shown for the sake of clarity) which are adjusted to vary the area of the nozzle by the hydraulic ram 89 which is supplied with servo fluid by the pump 90 through the control valve 91. The control valve 91 is a piston valve with two pistons so that when one of the conduits 92 leading to the hydraulic arm 89 is connected to the discharge conduit 93 of the pump, the other conduit 94 leading to the ram is connected to a drain pipe 95 leading back to a servo-fluid reservoir 96. The pressure in the discharge duct 93 is controlled by the relief valve 97 which vents excess pressure through the conduit 97a to the drain pipe 95.

The combustion system is generally similar to that described above with reference to Figures 4, 5 and 6 except that the main fuel instead of being supplied on to the baffle arms 98 is injected into the duct through a series of headers 97 which are spaced from the baffle arms 98. (Such an arrangement may, of course, be used in the construction of Figures 4–6, for example, in place of pipes 41.) The baffle arms therefore do not have a channel on their upstream face, but have the cross section shown in Figure 19 with the convex surface upstream and the two angle stiffeners 99 downstream.

However, in this construction instead of compressed air being employed to hold the baffle means in their non-baffling position the servo-fluid of the adjustable nozzle is used. To this end a duct 101 is led from the duct 94 into the cylinder 22 on the upstream side of the piston 21. When the re-heat system is employed the jet nozzle should be fully open and therefore the duct 94 will be connected to the exhaust duct 95. Thus there will be no pressure in the left hand end of the cylinder 22 when the jet nozzle is fully open. However, when the valve 91 is adjusted so as to shut the jet nozzle the fluid pressure is supplied from the duct 93 to the duct 94 and hence through the duct 101 to the left-hand end of the cylinder 22 and thus will hold the baffle means in their non-baffling position.

Figures 20 and 21 show another modification of the invention in which the baffle means are employed to give a swirl to the exhaust gases flowing past them when they are in the operative position. The baffle means comprises a series of baffle arms 105 each of which, as shown in Figure 20 is mounted to pivot about a pin 106 the axis of which lies obliquely to the axis of the bullet 17 on which the arms are mounted. When the arms are swung from their non-baffling position (Figure 20) to their operative position (Figure 21) they lie obliquely to the gas flow through the exhaust duct 15 and so cause it to swirl as well as provide sheltered regions downstream of themselves in which main fuel injected through the headers 106 can burn.

The mechanism for moving the baffle arms 105 and the structure for providing pilot fuel will be similar to that described above in detail with reference to Figures 4, 5 and 6, and it will be appreciated that a universal joint may be provided at each end of links 24 since the inner ends of arms 105 do not swing in axial planes. In this case the baffles will be moved to the closed position by the force of the gas stream. Alternatively, the end of link 24 may engage an elongated slot in the cylinder structure 22, to allow non-axial movement of the link with respect to the cylinder structure.

I claim:

1. A combustion system for an internal combustion engine comprising a duct through which combustion supporting gas flows, a body having a substantially frusto-conical downstream end within said duct with its apex end downstream and with its axis extending in the direction of gas flow through the duct, a plurality of baffle elements pivotally mounted on said frusto-conical downstream end of said body to be movable between an inoperative position in which they lie approximately on the surface of the cone of said frusto-conical downstream end and extend downstream beyond said frusto-conical downstream end and an operative position in which they extend at least part way across said duct in a substantially radial plane from the axis of said frusto-conical downstream end, main fuel injector means for introducing fuel into said duct to be stabilized in combustion by said baffle elements, pilot burner means mounted in the downstream end of said body, pilot baffle means supported by said pilot burner means, said pilot burner means and said pilot baffle means being movable along the axis of said frusto-conical downstream end between an inoperative position where they are enclosed by said baffle elements when the latter are in their inoperative position, and an operative position where said pilot burner means and said pilot baffle means lie substantially in the radial plane containing said baffle elements in their operative position, and means for effecting movement of the said baffle elements and said pilot burner means and said pilot baffle means between their operative and inoperative positions.

2. A combustion system according to claim 1 wherein each baffle element is a channel comprising a base and a pair of substantially parallel limbs, said limbs extending radially of said duct and upstream from said base when the baffle element is in its operative position, and wherein said main fuel injectors are located to supply main fuel onto said baffle elements when said baffle elements are in their operative position.

3. A combustion system according to claim 2, wherein the baffle elements are provided with flow-restricting means in said channels, whereby the flow of fuel distributed radially across the combustion space is controlled to maintain a substantially constant intensity of combustion therein.

4. A combustion system according to claim 3 wherein the fuel is distributed from the baffle elements through outlet ports and the outlet parts have their size selected in accordance with their position on the baffle elements to maintain substantially constant intensity of combustion.

5. A combustion system according to claim 1, wherein the baffle elements are of such shape and are so located, when in their operative positions, that they give swirl to the gases downstream thereof when they are in their operative positions.

6. A combustion system according to claim 1, comprising a fixed igniter, said igniter being located to be traversed by the spray of fuel from said pilot burner means during movement of said pilot burner means from the inoperative to the operative positions, and said pilot baffle means being effective to shelter said igniter when it is traversed by the spray of fuel.

7. A combustion system for an internal combustion engine comprising a duct through which combustion supporting gas flows, a body having a substantially frusto-conical downstream end within said duct with its apex end downstream and with its axis extending in the direction of gas flow through the duct, a plurality of baffle elements pivotally mounted on the frusto-conical downstream end of said body to be movable between an inoperative position in which they lie approximately on the surface of the cone of said frusto-conical downstream end and extend downstream beyond said frusto-conical downstream end and an operative position in which they extend at least part way across said duct in a substantially radial plane from the axis of said frusto-conical downstream end, main fuel injector means for introducing fuel into said duct to be stabilized in combustion by said baffle elements, a piston fixed within said body, a cylinder in sliding engagement with said piston, linkage means between said cylinder and said baffles, a supply of fuel under pressure, conduit means between said supply of fuel and the cylinder space on the downstream side of said piston, a pilot burner mounted on the downstream end wall of said cylinder and in hydraulic communication with said cylinder space, and pilot baffle means on the downstream end of said cylinder.

8. A combustion system as claimed in claim 7 further comprising at least one port in the wall of said cylinder, and a conduit between said port and said main fuel injectors, said port being so located in the wall of said cylinder that it is cut off from said supply of fuel under pressure by said piston when said baffle elements are in their inoperative position and is connected with said supply of fuel under pressure as a result of movement between said piston and said cylinder to cause said baffle elements to move to their operative positions, whereby fuel under pressure is supplied to said main fuel injectors when said baffle elements are in their operative positions.

9. A combustion system according to claim 7, comprising a supply of air under pressure, and conduit means between said pressure air supply and the portion of the cylinder on the upstream side of the piston, whereby the baffle means are secured in their non-baffling position by compressed air acting as a working fluid in a piston and cylinder device.

10. A combustion system according to claim 9, comprising also variable nozzle means at the outlet of said duct, which nozzle means are operated by servo-fluid, wherein the servo-fluid is employed as a working fluid in the piston and cylinder device to secure the baffle elements in their non-baffling position.

11. A combustion system for an internal combustion engine comprising an annular duct through which combustion-supporting gas flows, a substantially frusto-conical inner wall of said duct, a plurality of baffle elements pivotally mounted on the downstream end of said frusto-conical wall to be movable between an inoperative position in which they extend downstream of the said wall and lie approximately on the surface of the cone of which the said wall forms part and of which the apex lies downstream in the direction of the gas flow and an operative position in which they extend across the gas stream in substantially radial planes from the axis of said cone and into said annular duct, main fuel injector means for introducing fuel into said duct to be stabilized in combustion by said baffle elements, supporting structure for said inner annular wall, a piston fixed to said supporting structure, a cylinder in sliding engagement with said piston, linkage means between said cylinder and said baffle elements, a supply of fuel under pressure, conduit means between said pressure fuel supply and the portion of said cylinder on the downstream side of said piston, a pilot burner mounted on the downstream end wall of said cylinder and in hydraulic communication with the portion of said cylinder on the downstream side of said piston, and pilot baffle means on the downstream end of said cylinder to provide a sheltered region in which combustion of pilot fuel takes place.

12. A combustion system according to claim 11, wherein ports are provided in the baffle elements facing upstream of the gas flow and passages are formed in the pilot baffle means to conduct air from these ports to said shouldered region in which the combustion of pilot fuel takes place.

13. A gas-turbine jet-propulsion engine comprising a turbine rotor and, downstream thereof, an annular exhaust duct, said duct comprising an outer wall and an inner frusto-conical wall with its apex end downstream and with its axis extending axially of the duct, a jet pipe connected to said outer duct wall to receive exhaust gases from said turbine rotor, said jet pipe being axially aligned with said exhaust duct, and a combustion system for heating exhaust gas flowing through said exhaust duct, said combustion system comprising a plurality of baffle arms hinged to the downstream end of said frusto-conical wall and movable between an inoperative position in which they extend downstream of said frusto-conical wall and lie substantially on the surface of the cone of said frusto-conical wall, and an operative position in which they extend at least part way across said exhaust duct in a substantially radial plane from the axis of said exhaust duct, main fuel injectors for introducing main fuel into said exhaust duct to be stabilized in combustion by said baffle arms, a pilot fuel injector, pilot baffle means carried by said pilot fuel injector, said pilot fuel injector and said pilot baffle means being movable between an inoperative position in which they are enclosed by said baffle-arms and an operative position in which they lie in substantially the same radial plane as said baffle arms in their operative position, and means to move said baffle arms and said pilot fuel injector and said pilot baffle means between their inoperative and operative positions.

References Cited in the file of this patent

UNITED STATES PATENTS

| Number | Name | Date |
|---|---|---|
| 2,565,854 | Johnstone et al. | Aug. 28, 1951 |
| 2,572,723 | Hildestad | Oct. 23, 1951 |